US010523986B2

(12) United States Patent
Lonstein et al.

(10) Patent No.: US 10,523,986 B2
(45) Date of Patent: *Dec. 31, 2019

(54) METHODS FOR IDENTIFYING, DISRUPTING AND MONETIZING THE ILLEGAL SHARING AND VIEWING OF DIGITAL AND ANALOG STREAMING CONTENT

(71) Applicants: Wayne D. Lonstein, Ellenville, NY (US); Julie C. Lonstein, Ellenville, NY (US)

(72) Inventors: Wayne D. Lonstein, Ellenville, NY (US); Julie C. Lonstein, Ellenville, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/120,742

(22) Filed: Sep. 4, 2018

(65) Prior Publication Data
US 2018/0376185 A1 Dec. 27, 2018

Related U.S. Application Data

(63) Continuation of application No. 15/588,559, filed on May 5, 2017, now Pat. No. 10,080,047.

(51) Int. Cl.
H04N 7/025 (2006.01)
H04N 21/254 (2011.01)
H04W 4/12 (2009.01)
H04N 21/643 (2011.01)
H04N 21/4788 (2011.01)

(52) U.S. Cl.
CPC ..... *H04N 21/2541* (2013.01); *H04N 21/4788* (2013.01); *H04N 21/64322* (2013.01); *H04W 4/12* (2013.01)

(58) Field of Classification Search
CPC .............. H04N 21/25816; H04N 21/2585
See application file for complete search history.

(56) References Cited

U.S. PATENT DOCUMENTS

| 8,924,998 | B2* | 12/2014 | Matuchniak | H04N 7/162 725/25 |
| 2002/0141579 | A1* | 10/2002 | Murase | H04N 5/913 380/201 |
| 2002/0186843 | A1* | 12/2002 | Weinstein | G06F 21/10 380/201 |
| 2003/0177237 | A1* | 9/2003 | Stebbings | G06Q 20/40 709/225 |
| 2003/0195854 | A1* | 10/2003 | Wittkotter | G06F 21/10 705/51 |

(Continued)

*Primary Examiner* — Pankaj Kumar
*Assistant Examiner* — Timothy R Newlin
(74) *Attorney, Agent, or Firm* — Steve Hassid, Esq.; Partners Law Group Inc.

(57) ABSTRACT

Methods and systems for automatically monitoring, identifying, documenting, recording, interrupting, disrupting, educating, redirecting and infiltrating and/or monetizing the illegal and unauthorized sharing and viewing of video streaming content by using a keyword and an internet address and automatically retrieving data relating to the keyword and video streaming services or password sharing, automatically retrieving information relating to the retrieved data, automatically retrieving information relating with a combination of the first two retrievals, enhancing the data sets, and sending a message to the individual who shared the illegal share link or password and to all the viewers of the illegal video stream.

4 Claims, 6 Drawing Sheets

(56) References Cited

U.S. PATENT DOCUMENTS

| | | | |
|---|---|---|---|
| 2003/0204750 A1* | 10/2003 | Ng | H04H 40/90 726/22 |
| 2004/0117440 A1* | 6/2004 | Singer | G06F 21/10 709/203 |
| 2004/0254851 A1* | 12/2004 | Himeno | G06Q 30/02 705/26.1 |
| 2005/0050365 A1* | 3/2005 | Seki | H04L 63/1466 726/4 |
| 2005/0078944 A1* | 4/2005 | Risan | G06F 21/10 386/213 |
| 2005/0155069 A1* | 7/2005 | LaJoie | H04N 7/165 725/80 |
| 2006/0095935 A1* | 5/2006 | Ooi | H04N 21/4882 725/25 |
| 2008/0288770 A1* | 11/2008 | Kline | G06F 21/10 713/150 |
| 2009/0019468 A1* | 1/2009 | Ganesan | H04N 7/1675 725/25 |
| 2009/0080654 A1* | 3/2009 | Pri-or | G06F 21/10 380/201 |
| 2009/0183229 A1* | 7/2009 | Ohnishi | G06F 21/10 726/2 |
| 2010/0017892 A1* | 1/2010 | Iwamura | G06F 21/10 726/31 |
| 2010/0043081 A1* | 2/2010 | Kiayias | H04L 9/083 726/30 |
| 2010/0131971 A1* | 5/2010 | Hegglin | H04L 41/5022 725/25 |
| 2010/0199084 A1* | 8/2010 | Hamilton | H04L 9/08 713/150 |
| 2012/0047583 A1* | 2/2012 | Nyemahame | H04N 21/25816 726/26 |
| 2014/0215018 A1* | 7/2014 | Lam | H04L 63/108 709/219 |
| 2014/0304297 A1* | 10/2014 | Lian | G06F 21/10 707/769 |
| 2014/0325550 A1* | 10/2014 | Winograd | H04N 21/44236 725/19 |
| 2015/0040148 A1* | 2/2015 | Lonstein | H04N 21/44236 725/9 |
| 2015/0040240 A1* | 2/2015 | Fakhraei | G06Q 20/1235 726/26 |
| 2017/0060495 A1* | 3/2017 | Awatsu | G06F 3/1222 |
| 2017/0118537 A1* | 4/2017 | Stransky-Heilkron | G06F 21/16 |
| 2017/0289589 A1* | 10/2017 | Koumchatzky | G06N 3/0454 |

* cited by examiner

FIG. 3

| company_name | Total Count | Male | Female | Potential Impressions | Viewers | Average Age |
|---|---|---|---|---|---|---|
| Netflix | 7803 | 3572 | 3888 | 49,755,734 | 262 | 22.76 |
| Periscope | 41 | 29 | 8 | 14,692,307 | 413 | 27.90 |
| HBO | 1712 | 488 | 375 | 13,564,062 | 13,388 | 29.63 |
| UFC | 1032 | 689 | 85 | 8,419,426 | 191,640 | 26.08 |
| WWE | 1407 | 1058 | 151 | 7,612,630 | 16,902 | 30.66 |
| NFL | 467 | 310 | 77 | 7,003,513 | 9,069 | 32.00 |
| BT Sport | 320 | 235 | 37 | 6,607,896 | 2,461 | 34.06 |

| Comments | Likes | NPN | P-NPN | NPN/Periscope | Access Sharing | Requesting Periscope |
|---|---|---|---|---|---|---|
| 5 | 12986 | 40 | 1 | 21 | 7689 | 2 |
| 0 | 0 | 2 | 0 | 35 | 3 | 1 |
| 0 | 1544 | 149 | 0 | 264 | 1296 | 4 |
| 0 | 378 | 869 | 1 | 338 | 21 | 1 |
| 0 | 77 | 4 | 0 | 809 | 569 | 9 |
| 57 | 327 | 310 | 1 | 63 | 77 | 3 |
| 0 | 1220 | 3 | 0 | 12 | 304 | 0 |

FIG. 4

| Scrape String: | https://mobile.twitter.com/search?q=netflix%20password |
| Company: | Netflix |
| Source: | Twitter |
| Scrape since yesterday?: | True |

| Scrape String: | https://mobile.twitter.com/search?q=periscope%20superbowl |
| Company: | CBS |
| Source: | Twitter |
| Scrape since yesterday?: | True |

Company

BTN

Source

Twitter

Scrape url https://mobile.twitter.com/search?f=tweets&vertical=default&q=big%20ten%20network Scrape yesterday Yes

METHODS FOR IDENTIFYING, DISRUPTING AND MONETIZING THE ILLEGAL SHARING AND VIEWING OF DIGITAL AND ANALOG STREAMING CONTENT

CLAIM OF BENEFIT TO PRIOR APPLICATIONS

This application is a continuation application of U.S. patent application Ser. No. 15/588,559, filed May 5, 2017, which is incorporated herein by reference in its entirety.

BACKGROUND OF THE INVENTION

Field of the Disclosure

The present disclosure generally relates to methods for identifying, disrupting and monetizing and educating viewers of illegal and unauthorized sharing and viewing of video streaming content. More specifically, the invention relates to methods for monitoring the internet and other communications networks and live streaming applications for activity including, but not limited to the publication and distribution of video streaming content, for requests for the sale and/or sharing of passwords to video streaming content or user accounts to prevent or limit content piracy, brand erosion by unauthorized access and anarchy.

General Background

Live Streaming Applications ("LSAs") are applications used to stream live or recorded content to the public or a defined group of viewers. These LSAs have live streaming capabilities themselves or have live streaming capabilities built into their broader platform, and these LSAs include, but are not limited to, Periscope®, YouTube®, Facebook®, Instagram®, Livestream®, Live.me®, Google®, and future internet applications or internet platforms with live streaming capabilities. Anyone with a Computer, smartphone, tablet or other connected device, whether that person is at home, a movie theater or at an arena or stadium, could live stream what they are viewing, be it a TV show, movie or sporting event, to others anywhere on the planet. For this reason, LSAs have been referred to as Nano-Piracy Networks ("NPNs"). The ability to stream media content has been made so simple and the equipment so ubiquitous that anyone with a connected device can easily become public broadcasters, pirate sharers and/or viewers of media content, with no technical knowledge of setting up a live video streaming application or a server, website and camera. All that is needed is the LSA on a device, laptop, desktop or tablet with connectivity and the person can broadcast or receive media content to and from millions of viewers with the use of various forms of social media, resulting in the illegal and unauthorized mass distribution of media content. This is "One Click Piracy Streaming" and "One Click Piracy Viewing" all with the same application and no required technical knowledge by the streamer or viewer.

The current industry standard of monitoring and preventing unauthorized or illegal use and dissemination of media content often use traditional "top-down" distribution-based solutions to piracy. This approach often uses cease and desist letters or takedown notices, (e.g., the Digital Millennium Copyright Act ("DMCA") that are sent to internet service providers ("ISPs"), web hosting providers or online service provider ("OSPs"), Google® or the various LSA providers to try to prevent unauthorized or illegal use and dissemination of media content. This approach often involves identifying the live stream, sending a takedown notice and taking the necessary steps to have the live stream shut down or removed. Often, the effect of this is that web site where the live stream was hosted (and possibly shut down) reappears in another location and often with another name/brand and/or the event has ended making the inherent latency of the process a reason for its failure. Moreover, the receivers/viewers of the live steam simply look elsewhere for alternative options of consuming the unauthorized or illegal content. We call this lateral piracy migration caused by top-down pressure. These often traditional takedown approaches have several disadvantages, including, but not limited to, the delay ("Latency") in the ISPs or OSPs in responding to the takedown notice and acting upon it, especially when the content is of a live Event, any latency in responding to the notice may result in the Event ending before any take down action can be taken, the inability to deal with the rapidly growing number (estimated in the millions) of pirates worldwide, and the inability to interact and communicate directly with the streamers and viewers themselves (since takedown notices typically do not deal with the streamers or viewers themselves). Finally, the vendors who send out takedown notices do not address the effects and threat of password sharing, which is the practice of sharing login credentials with a third-party to allow that third-party to access various audio, video streaming content networks, including, but not limited to, Netflix®, Hulu®, Big Ten Network®, HBO®, Showtime® or History Channel®, Apple, Spotify®, Pandora® and Amazon® Prime. Thus, there exists a need to overcome these disadvantages.

First, the DMCA provides an OSP with a reasonable amount of time to respond to and act upon a takedown notice of copyrighted material. As such, an OSP does not need to immediately respond to a takedown notice, and streamers are streaming content that is live and set to end in a short amount of time, usually within three to four hours at most. Thus, a takedown notice might not get acted upon until well after the live stream or event has already ended. Therefore, there exists a need for solutions that can deal with video streams of live content and prevent them from being disseminated without the use of traditional takedown notices. In addition, OSP' or ISP's require definitive pedigree proof of the alleged infringing content. This creates additional latency and diminishes the efficacy of "top-down" DMCA and other "takedown" countermeasures.

Next, LSAs already have more than 300 million users, and this number will only grow as smartphones and tablets become more widely used and ubiquitous. Viewership in the last 12 months alone of proprietary content has eclipsed 1.35 Billion viewers globally. Each of these users can be a potential streamer of media content because each user has one or more of the LSA's installed on their phone. The LSA not only provides the user with the ability to watch live streaming content but to also stream live content themselves. Having to deal with potentially billions of live streaming pirates takedown notices are an a logistically impossible tactic for both the content owners and the ISP or OSP. Furthermore, an individual pirate and viewer would be lost in the crowd of billions. Therefore, there exists a need to be able to address, interact and manage the millions of live video streams, pirates and viewers where each live stream, pirate and viewer is given individual attention.

Additionally, as a result of the takedown notice approach, the viewers are left unaccountable. When a live stream goes down because of a takedown notice, the viewers just move on to another live stream. While the pirate may or may not be prosecuted, the viewers are never prosecuted. If viewers were given individual attention and their false sense of anonymity removed, the viewers would feel more accountable for their illegal activities. Presently, piracy is widely considered a victimless offense. Therefore, there exists a need to give the viewers of live video streams personal, individual attention to expose their activities as unauthorized and inform them of their unauthorized access.

Additionally, the takedown notice approach and the vendors who use this approach does not address the issue and activity involving password selling and/or sharing on social media, forums and blogs. Users of social media, forums and blogs often share their passwords to video streaming content services or over-the-top services ("OTT") with others. Those who use these passwords could then use these OTTs for a nominal amount or free, lowering the value of the services to those who pay full price from the content owner and reducing the paid subscribers to the service. Vendors do not monitor social media, forums or blogs for password selling and/or sharing because takedown notices have no effect on password selling and/or sharing. Because those using a shared password and those who sell or share their password are not held accountable, they will continue to password share. Therefore, there exists a need to scan and monitor social media, forums and blogs for password selling and/or sharing and to hold accountable those who would participate in password selling and/or sharing.

Finally, content owners, creators, broadcasters and their vendors who use the takedown notice approach are spending money in monitoring for illegal live streaming and issuing takedown notices, not to mention in the prosecution of the streamers. The streamers, and the viewers, in this approach are ignored in terms of monetization. Therefore, there exists a need for a new organic approach where the streamers and the viewers can be detected, documented, diverted, disrupted, redirected, monetized and converted into a paying subscriber.

The inventions of the present disclosure provide these and other various benefits and advantages.

SUMMARY

The present disclosure provides methods and systems with the benefits and advantages, including, but not limited to, partially and fully automated monitoring, identifying, documenting, recording, interrupting, disrupting, educating, redirecting and infiltrating both on a streamer and viewer basis, remediate the illegal live streaming of digital content with minimal latency and in scale, to efficaciously monitor the activity and manage hundreds of thousands of live video streams, and billions of viewers where each live video stream, pirate and/or viewer is given individual interaction and remediation; the ability to interact and remediate viewers of live video streams; the ability to scan, monitor and document social media, forums and blogs for password sharing ("access-fraud") and to hold accountable would-be participants in password selling and/or sharing; and the ability to monetize illegal streamers and viewers of digital content and/or educate, re-direct, divert and/or convert those streamers and viewers into paid or otherwise legal subscribers/consumers by providing a website, application or other virtual or physical legal access portal for content address link to an authorized version of the video streaming content. Essentially, using this technology will allow content owners and others with interest of LSA viewer trends, patterns, identities, likes, dislikes and other relevant content delivery and content consumption data to access the information and deploy countermeasures in real time. The inventions of the present disclosure can be used for a wide variety of uses including but not limited to, law enforcement, monitoring for crime, terror and other unacceptable uses of the media content.

The present disclosure solves various problems, including but not limited to identifying, deterring and monetizing the currently unchecked activity within live streaming applications, video streaming content on the internet, peer-to-peer or other bi-directional digital transmission, whether the content is live or pre-recorded, including but not limited to those broadcasts or streams created under "private" or "followers only" settings which would otherwise prevent their detection. This technology adopts the "ICE" (Identify, Communicate, Eradicate) method for both the control of Nano-Piracy as well as developing new methods and vehicles to legally monetize content consumption. In the brick and mortar world, the problem is analogous to sneaking into a music concert, football game or movie theater without paying or intercepting, sharing, stealing or otherwise unlawfully accessing neighbor's TV cable, satellite or Wi-Fi signals to watch TV for free. However, with the internet peer-to-peer or other bi-directional digital transmission, LSAs, tethered to social media, such as, but not limited to, internet applications or internet platforms with live streaming capabilities, including YouTube®, Twitter®, Instagram®, Facebook® or Snapchat®, among others, billions globally are immediately and directly notified of video streaming content and can immediately access the illegal content without searching, and in "one-click" watch the concert, game, movie, TV show or other digital content. The dispersity and numerousness of the billions make remediating illegal or unauthorized behavior impossible without the use of the satellite, cellular, fiber or other telephonic, radio, microwave, wi-fi, peer-to-peer/peer-to-many communications modalities, internet, computers and specially designed algorithms. The inventions of the present disclosure solve various problems, including but not limited to the problem of dispersity and numerousness in a digital world by using the very tools that are used to spread illegal video streaming content exponentially and virally.

In one embodiment, the present disclosure provides for a computer-implemented method for automatically monitoring, identifying, documenting, recording, interrupting, disrupting, educating, redirecting and infiltrating and/or monetizing the illegal and unauthorized sharing and viewing of video streaming content, the method comprising: using a processor and memory of a network connected computer to place into the memory, of a network connected computer, at least one, but not limited to, keyword, images, watermarks, pixelation, distortion, steganographic embedment's, message or numerical algorithms from a list of keywords, images, watermarking, pixelation, distortion, steganographic embedment's, messages or numerical algorithms and at least one website from a list of websites that are stored on a non-transitory computer-readable storage medium of a network connected computer; sending a command request from a network connected computer to a web server associated with at least one of the selected websites to request the web server return communications associated with at least one of the selected keywords; receiving communications from an internet or network connected computer or server, device, handheld or other digital communication instrumentality; using the processor and memory to run pattern matching of embedded digital content, images, watermarks, steganographic embedment's, message or numerical algorithms in, or on the communications in order to place into memory of a network connected computer the resolved internet addresses, devices, MAC addresses, accounts, IP addresses, found to match digital audio and/or video streaming services; establishing at least one electronic relationship to at least one web server device, handheld, devices, MAC addresses, accounts, network addresses, internet addresses, IP addresses or other digital communication instrumentality associated with at least one website address; gathering and storing, on a non-transitory computer-readable storage medium of a network connected computer, information associated with the established relationships; and sending at least one electronic message associated with the relationship comprising of a website address link to an authorized version of the video stream. Based on pre-populated data of available broadcasts on linear, wireless and online broadcasts the processors will search the internet to "Identify" all relevant streams. In addition, the identification process will rely upon the persona creation engines to enter, follow, friend and subscribe to broadcasters identified and to locate new streamers to follow, friend and subscribe to. In so doing, streamers will "self-identify" themselves to the system by sending automated instant notifications to the system. The processor will create virtual personas based upon the specific characteristics of each identified streamer based upon algorithmic creation protocols including but not limited to demographic, geographic, social, technical or other relevant factors. These generated characteristics include, but are not limited to, name, gender, age, social media username, phone number, browser agent, employment history and status, current location, social media consumption habits, and recovery questions such as favorite color, mother's maiden name, first vehicle, among others. This will allow the greatest probability of the virtual persona be accepted by the streamer. Once accepted the streamer will then automatically notify the system of each prospective Nano-pirate broadcast immediately and the system will automatically identify, monitor, document and analyze the broadcast for both legal, illegal and otherwise relevant information.

The methods and systems of the present disclosure will constantly and dynamically adjust, expand, contract and/or modify the virtual personas in order to maintain temporal, geographic, demographic and occurrence relativity enhance the virtual personas on a continual basis. Using social media, print and broadcast news, entertainment publications and websites, search trends, Nielsen ratings, and other social and traditional media, the system will constantly and automatically monitor and add, subtract, modify or otherwise relevantly adjust the virtual personas. This can include not only consumption trends, but also life trends, such as changes in health, family life, location and other ordinarily occurring events, including births and deaths. Additionally, appropriate media and photo posts will automatically populate and delete and even mark private in order to appear genuine. This learning automation will also automatically search for and interact with database information to ensure all modifications and new personas maintain social, geographic and temporal relevance. The ability of the system to detect through crawling and manual entry to subscribe to or follow LSA networks which discuss, mention, trend or advertise the private Nano-Piracy of content sought to be identified, monitored, documented and addressed by content owners, law enforcement, national security or other stakeholders who cannot access the content because of the countermeasures used by streamer to mask, hide or otherwise obscure their illegal activity. The system also documents and learns in the persona database system the trends of social, geographic, temporal, content or subject matter in order to better scour for more private networks. Once the networks are infiltrated, the present disclosure automatically receives notice of and access to private content. With this access, the present disclosure can then remediate per client requests. Additional, multiple identities will also seek and infiltrate other private Nano-Piracy networks' PNPN's while making it impossible to be differentiated from ordinary followers by the pirate. The virtual personas will also be preprogrammed to respond the communications by a pirate seeking to verify authenticity using preprogrammed learned responses as well as notification of human attendant for override responses that were previously not in database.

The system will also use the above described hardware, software, processors, peripherals and systems to document and communicate with streamers, viewers or both. In the identification process, multi-faceted separate databases based upon, factors such as stream content, stream viewers, streamer identities, geographic data of stream origination, geographic data of stream viewers, all the while increasing its virtual persona creation database and maintain virtual networks by the creation, evolution and expanding reach of the personas.

Various embodiments of the present disclosure also conduct an automated analysis and collection of video, audio, or other digital content streams from the internet, peer-to-peer/peer-to-many and other bi-directional electronic communication mediums based upon user defined configurations of indicators including, but not limited to time, length, location, duration, title, device, association with other linear, OTT ("Over The Top"), or other broadcasts or transmissions, time of broadcast, lengths and locations, start time, end time and correlation with actual events occurring globally, i.e. streams or other communications or publications commencing during or shortly before or after the commencement of original/live content broadcasts or in venue events, social media mentions, search trends, likes, replies, re-tweets, comments or other broadcast internal data or comments, text, phone or email messaging traffic, patterns or other algorithmic calculation as may, from time to time be associated with the particular broadcast or live content. These user defined factors can also be configured to take data from "chat-log," viewer, streamer, listener or other attendee login, location, identity, username, similarity, geographic, content, length, syntax, language, title, capitalization, dialect, grammar, punctuation, screen location, network, friends, contacts, or relationship to other usernames for "throw-away, phony, counterfeit or intentionally mislabeled or misleading accounts" on social, traditional or other electronic mediums, meta-data, device typeset, electronic signature, signal strength, impedance, static, ping-rate, RSSI ("Received Signal Strength Indicator") (−dBm) (3G, CDMA, UMTS/EV-DO), Kbps, Mbps, TDR analysis, Baud Rate, Traceroute, TCP/IP configuration, Ping command, ms reply times, network traffic, packets size distribution comparison, backwards compatibility, broadcast storm indicator rating, traditional linear broadcast rating and demographic information, bottleneck analysis, DMCA notice issuance trends including but not limited geographic, time, spatial, content, target, content owner, alleged infringer and related information, ASiD data, SPP data, automated DMCA takedown data, litigation data, ISP notification data originating and receiving ISP data, encryption and decryption rates and trends, mobile, broadband, cable, satellite, fiber and cellular data usage, traffic patterns and live transmission statistics, MAC Addresses, ISPs, Computer Name, Email addresses, Device Make/Model.

The technology is multi-fold and implements specifically created and configured hardware and software to accomplish its goals. The Identify component uses processors, databases, hard drive and automated algorithmic creation in order to perform a global online monitoring system for digital content being Nano-Pirated or otherwise improperly used or accessed. In this function the data storage systems are designed to function and be capable of efficiently handling rapidly growing information being streamed via LSA's in storage capacities of data using online or offline cloud, hard disk drive, Solid State Drive compressed and laser engraved diamond storage technologies. Additionally, the system will imbed processors within the storage devices in order to be able to simplify and exponentially increase the speed and capacity of the storage hardware. By embedding processors, the drives, diamonds or other storage devices will be able to efficiently store data and video of streams in Megabytes, Gigabytes, Terabytes, Petabytes, Exabytes, Zettabytes and Yottabytes. With chips embedded in the drives containing upwards of 1000 processors using speeds in excess of 8 GHZ using air, gas and geothermal or other cooling to aid in processing speed. This will allow the system to automatically scale up and down in response to identified stream popularity and bandwidth consumption to effectively load-balance or scale processor speeds and storage capacities instantly.

Based on pre-populated data of available broadcasts on linear, wireless and online broadcasts, live events, news, occurrences, and advertisements, the processors will cause software running on the network connected computer to initiate a search of the internet or other communication platforms to "Identify" all relevant streams. In addition, the identification process will rely upon the virtual persona creation engines to follow, friend and subscribe to broadcasters identified and to locate new streamers to follow, friend and subscribe to, including but not limiting to their followers, contacts, friends, subscribers, and those who they follow. In so doing, streamers will "self-identify" themselves to the system by sending automated LSA generated instant notifications to the system. The system processor will create virtual personas based upon the specific characteristics of each identified streamer based upon algorithmic creation protocols including but not limited to demographic, geographic, social and technical or other relevant factors. This will allow the greatest chance to allow the virtual persona to be accepted by the streamer, viewer or other access sharing network. Once accepted, the streamer, by the inherent social media tethering attendant to all LSA's, who will in turn will then automatically upon commencement, notify the system of each prospective Nano-Pirate broadcast automatically and the system will automatically identify, monitor, document and analyze the broadcast or transmission for both legal, illegal and otherwise relevant information. By acceptance as a follower, friend, contact or other relationship, the dynamic virtual personas will additionally be notified of non-public, private or other secretive settings on all LSA's, which are designed to allow the streamer and/or viewer to anonymize the stream and limit public knowledge and therefore detection of such streams.

Various embodiment of the methods and systems of the present disclosure also use the above described hardware, software, processors, peripherals and systems to document and communicate with streamers, viewers or both. In the identification process, multi-faceted separate databases based upon factors such as, but not limited to, stream content, stream viewers, streamer identities, geographic data of stream origination, geographic data of stream viewers, all the while increasing its virtual persona creation database and maintain virtual networks by the creation, evolution and expanding reach of the personas.

In another embodiment, the present disclosure provides for a computer-implemented method for automatically monitoring, identifying, documenting, recording, interrupting, disrupting, educating, redirecting and infiltrating and/or monetizing the illegal and unauthorized sharing and viewing of video streaming content. The method comprising of using a processor and memory of a network connected computer to place into the memory, of a network connected computer, at least one keyword from a list of keywords used to in conjunction with other data including temporal, geographic, demographic, behavioral, relational, mathematic, data and characteristics to form algorithms and at least one website from a list of websites that are stored on a non-transitory computer-readable storage medium of a network connected computer; sending a command request from a network connected computer to an internet or network connected computer or server or other communication technologies associated with at least one of the selected websites to request the web server return communications associated with at least one of the selected keywords; receiving communications from the web server; using the processor and memory to run pattern matching on the communications in order to place into memory requests for and sharing of passwords to video streaming content services; gathering and storing, on a non-transitory computer-readable storage medium of a network connected computer, information associated with the requests for and sharing of passwords; and sending at least one message through the user's electronic contact with the at least one message containing a website address link or other relevant access portals to an authorized version of the video, audio, or digital content stream or transmission.

In yet another embodiment, the present disclosure provides for a computer-implemented method for identifying, disrupting and monetizing the illegal sharing and viewing of video streaming content, the method comprising: using a processor and memory of a network connected computer to place into the memory, of a network connected computer, at least one pattern from a first list of patterns including, temporal, geographic, demographic, behavioral, relational, mathematic, data and characteristics to form algorithms and at least one website from a list of websites; sending a command request from a network connected computer to a web server associated with at least one of the selected websites to request the web server return communications associated with at least one of the selected patterns; receiving communications from the web server; using the processor and memory to run pattern matching on the communications and a second list of patterns in order to place into memory matches found between them; gathering and storing, on a non-transitory computer-readable storage medium of a network connected computer, information associated with a match; and sending at least one electronic message associated with the relationship comprising of a website address link to an authorized version of the video stream.

With the ability to virtually interact with in real-time social media or other communication the system will allow itself to develop personal traits for each persona to make the appearance of being a real person and therefore much more likely to be believed and accepted.

Additionally, the system will document each instance of piracy streaming no matter, what the platform, including but not limited to Data, Metadata and Watermark and/or digital fingerprinting, machine learning, GPU learning, image/ video, audio or other content recognition or other identifier and store such information in relation not only to the streamer of the content, but also to the identity and persona of each viewer. This will provide a dynamic, growing and active database of viewer likes, dislikes, habits and behaviors.

DRAWINGS

The above-mentioned features and objects of the present disclosure will become more apparent with reference to the following description taken in conjunction with the accompanying drawings wherein:

FIG. 3 shows an exemplary screenshot of the database that stores all the information about the scanning and monitoring of websites, along with sample data, not to be taken as exclusive or as the only information that is collected.

FIG. 4 shows exemplary search websites along with associated search keywords.

Figure 6:
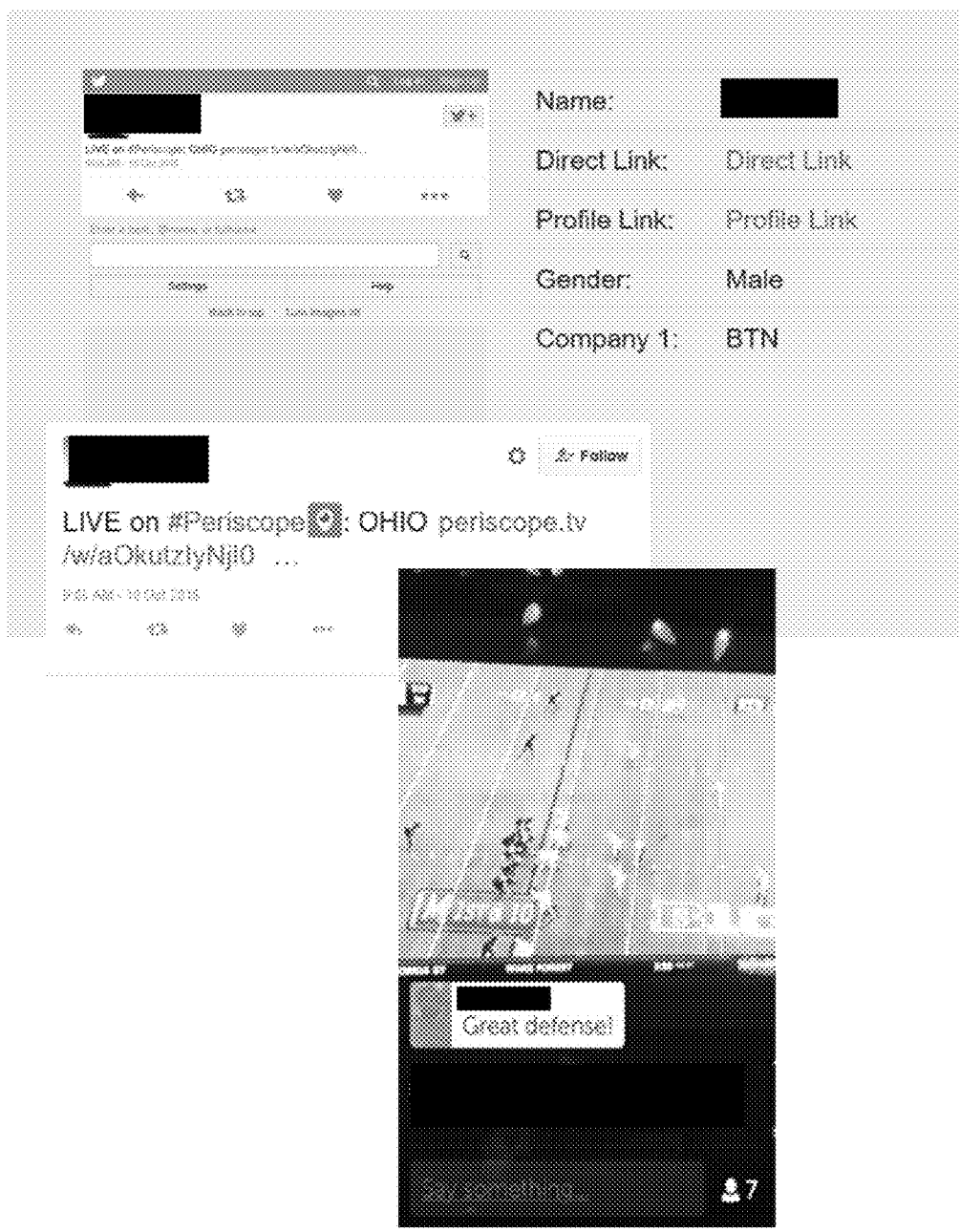

FIG. 6 shows an exemplary result found for a search that used the BTN as a search term. Here, a college football game, with "Ohio" in the result was found on Twitter®. Also showing is a screenshot of an example Periscope® live feed of a college football game with the game playing on a TV.

DETAILED DESCRIPTION

In yet another embodiment, the present disclosure provides computer-implemented method for automatically monitoring, identifying, documenting, recording, interrupting, disrupting, educating, redirecting and infiltrating and/or monetizing the illegal and unauthorized sharing and viewing of video streaming content, the method comprising: using a processor and memory of a network connected computer specifically constructed to enable the simultaneous functions embodied in the disclosure, to place into the memory, of a network connected computer, at least one keyword from a list of keywords and at least one website from a list of websites including website data including, but not limited to including temporal, geographic, demographic, behavioral, relational, mathematic, data and characteristics to form algorithms that are stored on a non-transitory computer-readable storage medium of a network connected computer; sending a command request from a network connected computer to a web server associated with at least one of the selected internet addresses to request the internet or network connected computer or server return communications associated with at least one of the selected keywords; receiving communications from the internet or network connected computer or server; using the processor and memory to run pattern matching on the communications in order to place into memory resolved internet addresses found to match video streaming services; establishing at least one electronic relationship to at least one internet or network connected computer or server associated with at least one website address; gathering and storing, on a non-transitory computer-readable storage medium of a network connected computer, information associated with the established relationships; and sending at least one electronic message associated with the relationship comprising of a website address link to an authorized version of the video stream. The technology is multi-fold and implements specifically created and configured hardware and software to accomplish its goals. The Identify component uses processors, databases hard drive and automated algorithmic creation in order to perform a global online monitoring system for proprietary content being Nano-Pirated. In this function, the data storage systems are designed to function and be capable of efficiently handling rapidly growing information being streamed via LSA's in storage capacities of data using cloud, Hard Disk Drive, Solid State Drive compressed and laser engraved diamond storage hardware. Additionally, the system will imbed processors within the storage devices in order to be able to simplify and exponentially increase the speed and capacity of the storage hardware. By embedding the processing into the drives, diamonds or other storage devices will be able to efficiently store data and video of streams in Petabytes, Exabytes, Zettabytes and Yottabytes. With chips embedded in the drives containing upwards of 1000 processors using speeds in excess of 8 GHZ using air, gas and geothermal or other cooling to aid in processing speed. This will allow the system to automatically scale up and down in response to identified stream popularity and bandwidth consumption to effectively load-balance processor speeds and storage capacities instantly.

In yet another embodiment, the present disclosure provides for a computer-implemented method for identifying, disrupting and monetizing the illegal sharing and viewing of video streaming content, the method comprising: using a processor and memory of a network connected computer to place into the memory, of a network connected computer, at least one keyword from a list of keywords including temporal, geographic, demographic, behavioral, relational, mathematic, data and characteristics to form algorithms and at least one website from a list of websites that are stored on a non-transitory computer-readable storage medium of a network connected computer; sending a command request from a network connected computer to a web server associated with at least one of the selected websites to request the web server return communications associated with at least one of the selected keywords; receiving communications from the web server; using the processor and memory to run pattern matching on the communications in order to place into memory requests for and sharing of passwords to video streaming content services; gathering and storing, on a non-transitory computer-readable storage medium of a network connected computer, information associated with the requests for and sharing of passwords; and sending at least one message through the user's electronic contact with the at least one message containing a website address link to an authorized version of the video stream.

In yet another embodiment, the present disclosure provides for a computer-implemented method for identifying, disrupting and monetizing the illegal sharing and viewing of video streaming content, the method comprising: using a processor and memory of a network connected computer to place into the memory, of a network connected computer, at least one pattern from a first list of patterns including temporal, geographic, demographic, behavioral, relational, mathematic, data and characteristics to form algorithms and at least one website from a list of websites; sending a command request from a network connected computer to a web server associated with at least one of the selected websites to request the web server return communications associated with at least one of the selected patterns; receiving communications from the web server; using the processor and memory to run pattern matching on the communications and a second list of patterns in order to place into memory matches found between them; gathering and storing, on a non-transitory computer-readable storage medium of a network connected computer, information associated with a match; and sending at least one electronic message associated with the relationship comprising of a website address link to an authorized version of the video stream.

In yet another embodiment, the communications the web server will return is in at least one format, including and in no way made in limitation, text or plain text, binary, image, audio, video, encrypted, non-encrypted, compressed or non-compressed, among others. In yet another embodiment, the communications is a combination of those listed, among others.

In yet another embodiment, the websites searched, thereby receiving the command request, are social media websites, such as, but not limited to, Twitter®, Google+®, Facebook®, Instagram®, YouTube®, and among others. In yet another embodiment, the websites searched, thereby receiving the command request, are forums, such as, but not limited to, Reddit®, TV show fan forums, IMDB®, movie fan forums, among others. In yet another embodiment, the websites searched, thereby receiving the command request, are blogs, such as, but not limited to, TV show review blogs, movie review blogs, among others.

In yet another embodiment, the returned communications from the web server will contain website address links to live video streaming content. In yet another embodiment, the links will be direct links to the actual live or recorded video streaming content on an LSA. In yet another embodiment, the website address links will be to another page that has the direct website address links to the live video streaming content on an LSA.

In yet another embodiment, the website address links will be to a URL shortened, such as, but not limited to, tinyurl, "t.co" or Bitly®, or a URL forwarder, all of which will mask the original website address. The present disclosure will resolve the links until the ultimate destination is determined. As an example, when a user posts a link on Twitter®, Twitter® automatically changes the link to have a t.co domain name along with random numbers after the first slash. Determining the ultimate destination of the link is called resolving the link.

In yet another embodiment, when the link is to the direct live streaming video content, a network connection is established to the LSA and the channel or stream where the live video streaming content is being hosted. In yet another embodiment, the length of the connection will be long enough to gather all the necessary information, then the connection will be dropped. In yet another embodiment, the network connection will be persistent for the duration of the live streaming video content and the channel or stream itself.

In yet another embodiment, the processor will run a pattern matching algorithm on the communications to find relevant links to video streaming services and/or password requests and fulfillments.

In yet another embodiment, the information gathered and stored about the stream includes screenshots of the live stream. In yet another embodiment, the information gathered and stored about the stream includes a video recording of the live stream. In yet another embodiment, the information gathered and stored about the stream includes both a screenshot and a video recording of the live stream.

In yet another embodiment, the information is stored in a database on a non-transitory computer-readable storage medium of a network connected computer. In yet another embodiment, the database is a relational database, such as, but not limited to, MySQL®. In yet another embodiment, the database is a non-relational database, such as, but not limited to, MongoDB®. In yet another embodiment, the information is stored in a text file. In yet another embodiment, the information is stored in a customized database with the customizations selected from, but not limited to, connection pooling, connection persistence, increased maximum connections, increased maximum open connections, increased cache, increased worker count, automated backups, native compatibility to integrate into other database platforms, automated crash learning to automatically fix, repair, and learn from previous crashes, and automated data compression with secure access to offline private storage, and other customizations.

In yet another embodiment, the database is stored on the same network connected computer from which the command request originates. In yet another embodiment, the database is stored on a separate network connected computer. In yet another embodiment, the database is stored on a specialized database server.

In yet another embodiment, the information gathered about the user who shared the link is the user's social media accounts, such as, but not limited to, Twitter®, Facebook®, LinkedIn®, among others. Also, including, but not limited to, in the information is the user's username, profile name, user unique identifier, such as a user ID, internet protocol (IP) address, network address, internet address, date and time of the sharing of the link, profile link, status, biography, approximate location, time zone, a screenshot of the post that contained the link on a web site, among others.

In yet another embodiment, the information gathered about the user who requested a password to video streaming content is the user's social media accounts, such as, but not limited to, Twitter®, Facebook®, LinkedIn®, among others. Also, including, but not limited to, in the information is the user's username, profile name, user unique identifier, such as a user ID, internet protocol (IP) number, date and time of the sharing of the link, profile link, status, biography, approximate location, time zone, a screenshot of the post that contained the request, among others.

In yet another embodiment, the information gathered about the user who shared the password to video streaming content is the user's social media accounts, such as, but not limited to, Twitter®, Facebook®, LinkedIn®, among others. Also, including, but not limited to, in the information is the user's username, profile name, user unique identifier, such as a user ID, internet protocol (IP) number, date and time of the sharing of the link, profile link, status, biography, approximate location, time zone, a screenshot of the post that contained the sharing of the password, among others.

In yet another embodiment, the information gathered about the streamer and the viewers is the streamer's and the viewers' social media accounts, such as, but not limited to, Twitter®, Facebook®, LinkedIn®, among others. Also including, but not limited to, in the information is the streamer's and the viewers' IP, network or internet addresses, date and time of the streaming and viewing of the live video streaming content, the length of the streaming, the length of the viewing for each individual viewer, username, profile name, Twitter® profile link, Twitter® followers, Twitter® description, stream title, latitude and longitude, city, state, country, stream start time, stream end time, stream duration, total viewers, viewer data, such as username and UUID or another unique identifier, timeline of viewers over time, all metadata, among others.

In this embodiment, the system allows content owners or other interested parties to "Communicate" with the pirate viewer or streamer in "real-time" messaging within the specific platform or by social media, email, SMS or even phone to: all viewers and the streamers (Global) messaging or directly to the streamer (Individual) or any individual viewer or group of viewers individually. The system simultaneously searches multiple databases within the system and other third party systems and databases to develop a "Pedigree" with contact information and other relevant data culled from the systems multiple databases that the individual has currently or previously appeared. Messaging can be either in the platform or through separate forms of communications enabled by the database "pedigree".

The messaging can be multi-fold and is automated pursuant to the objective of the system user. Messages or even virtual conversations with viewers and/or streamers can disrupt the stream, threaten consequence, expose identity of streamers and/or viewers thereby destroying the perception of anonymity, threaten consequences, re-direct to legitimate sources of content, give bonuses, coupons discounts, education or even new methods of simplified access to and payment for legal consent consumption either within the app or platform itself to by link to another platform or Additionally, multiple "virtual personalities" can be generated within the stream based on algorithms culling data from the system databases which can create the appearance of likeminded individual(s) within the stream who converse in real time with streamers and/or viewers to help provide a "strength in numbers" or "group membership" desire on the part of streamers and/or viewers. Streamer's and viewers' display screens that indicate that the live video stream is illegal. This message will be public for all to see at the same time. The messages can also be private, being sent to each individual streamer and viewer separately. In yet another embodiment, this message contains personal information for the streamer.

In yet another embodiment, various data inputs (e.g., an online dis-inhibition effect) can be used to tailor or customize messages so viewers, password sharer and/or streamers to increase, reduce or eliminate a certain action or result (e.g., reducing password sharing or eliminating viewing or dissemination of protected content) as desired for a particular circumstance. In an embodiment, data from prior actions take and their effect, along with ping technology can be used to monitor and determine efficacy of each method.

These messages provide for, among other benefits, quicker action to deal with video streams of live content. Instead of going through a DMCA takedown notice, these messages alert everyone streaming or watching the video stream of the illegality of the video stream. It will also put everyone on notice that they are now being watched and that their behavior is unacceptable and illegal. This will discourage the streamer and any other streamers or potential streamers.

In yet another embodiment, the messages sent to the streamers and viewers are private. In yet another embodiment, the messages are customized for each individual streamer and viewer such that the message will include, but not limited to, their name, social media account usernames, a screenshot of the video streaming content, among others. In this way, each streamer and viewer is given personal, individualized attention, in order to demonstrate that they are not anonymous and that their behavior, if it continues, will have consequences.

In yet another embodiment, the message sent to the streamers and viewers is a text message and indicates that the live video stream is illegal. In yet another embodiment, the message is an image that indicates that the live video stream is illegal. In yet another embodiment, the message is an audio message that indicates that the live video stream is illegal. In yet another embodiment, the message is a video message that indicates that the live video stream is illegal.

In yet another embodiment, the messages will include a link to an authorized version of the video streaming content. In yet another embodiment, the messages will include a link to a page where the streamers and viewers can purchase a license to view the video streaming content.

In yet another embodiment, the requests for passwords are for video streaming content websites that provide media content, such as, but not limited to, TV shows and movies, or sporting events. Some of these services include, but not limited to, ESPN®, Netflix®, Hulu®, Big Ten Network®, HBO®, Showtime® or History Channel®, Ligtv®, Sky.com®, GOL®, Fox News®, CNN®, BBC®, RT®, Al Jazeera®, BeIN®, Televisa®, among others. In yet another embodiment, the video streaming content is live. In yet another embodiment, the video streaming content is prerecorded.

In yet another embodiment, the first list of patterns comprises of keywords. In yet another embodiment, the first list of patterns comprises of hashes of keywords, audio signals or video segments, a including temporal, geographic, demographic, behavioral, relational, mathematic, data and characteristics among others to form algorithms In yet another embodiment, the second list of patterns comprises of resolved links to video streaming services. In yet another embodiment, the second list of patterns hashes of keywords, audio signals or video segments, a including temporal, geographic, demographic, behavioral, relational, mathematic, data and characteristics among others comprises of requests for or sharing of passwords to video streaming services.

In yet another embodiment, the present disclosure will give a rating to a video streaming content broadcast. The rating is calculated by obtaining the actual viewers and adding the dividend of impression universe and actual NPNs (Nano-Piracy Networks). This will allow for both the actual popularity of a broadcast to be rated as well as potential. This will allow for the industry to monetize ad sales and other monetization models. The algorithm can also be customized to include temporal, geographic and demographic information to provide customers with deep granular insight allowing for individualized anti-privacy, marketing or other business objectives.

In yet another embodiment, the present disclosure will give a rating to a video streaming content broadcast. The rating is calculated by obtaining the actual viewers and adding the dividend of impression universe and actual NPNs (Nano-Piracy Networks). (this rating can also be adjusted, modified, or otherwise adjusted to create a method by which networks, broadcasters, advertisers, content purchasers, digital rights owners or other stakeholders, to immediately, effectively and accurately measure LSA "legal" broadcasts which have begun to, and will inevitably compete with traditional "linear" or "streaming" content consumption formats. This will allow for both the actual popularity of a broadcast to be rated as well as potential. This will allow for the industry to monetize ad sales and other monetization models. The algorithm can also be customized to include temporal, geographic and demographic information to provide customers with deep granular insight allowing for a robust legal LSA content viewing and content consumption ala "Neilsen Ratings."

Figure 1:
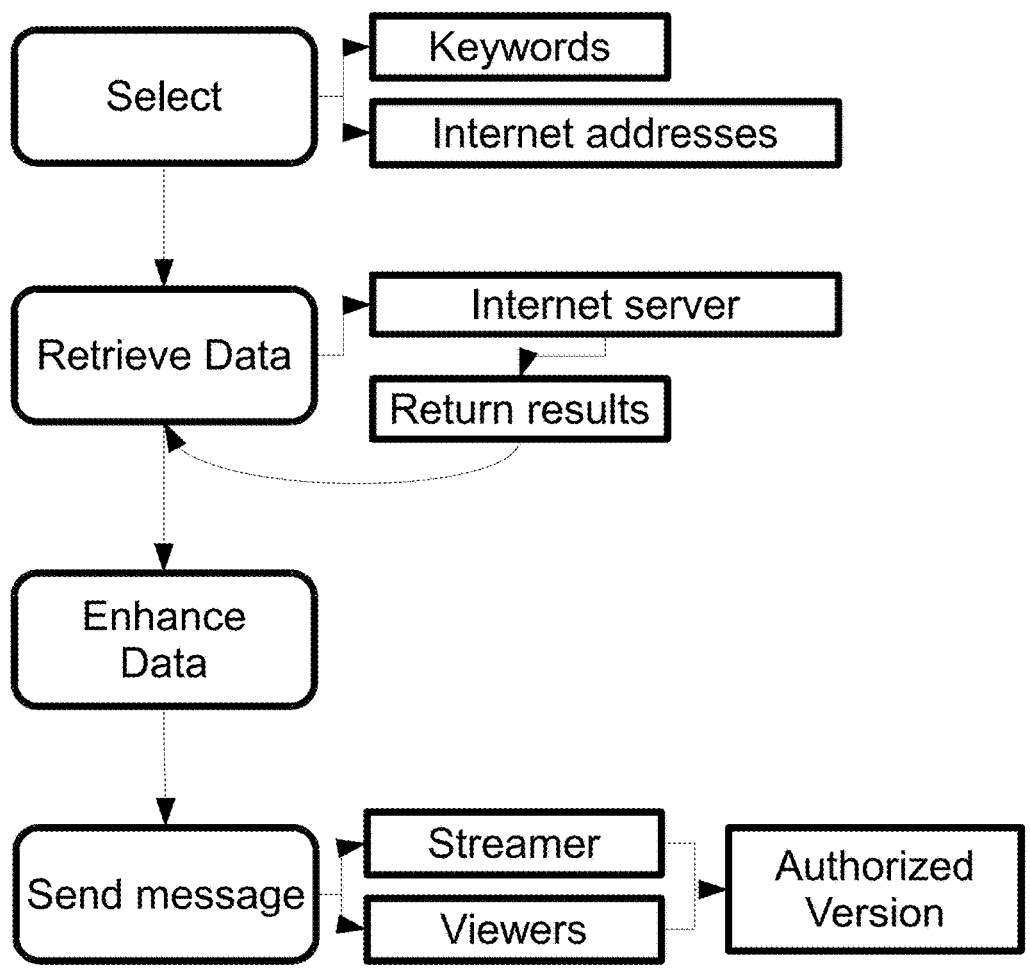
FIG. 1 shows an exemplary flowchart of monitoring websites for website addresses to video streaming content and an exemplary process for which the present disclosure operates.

As shown in FIG. 1, shows a flowchart of an exemplary embodiment of the present disclosure.

Figure 2:
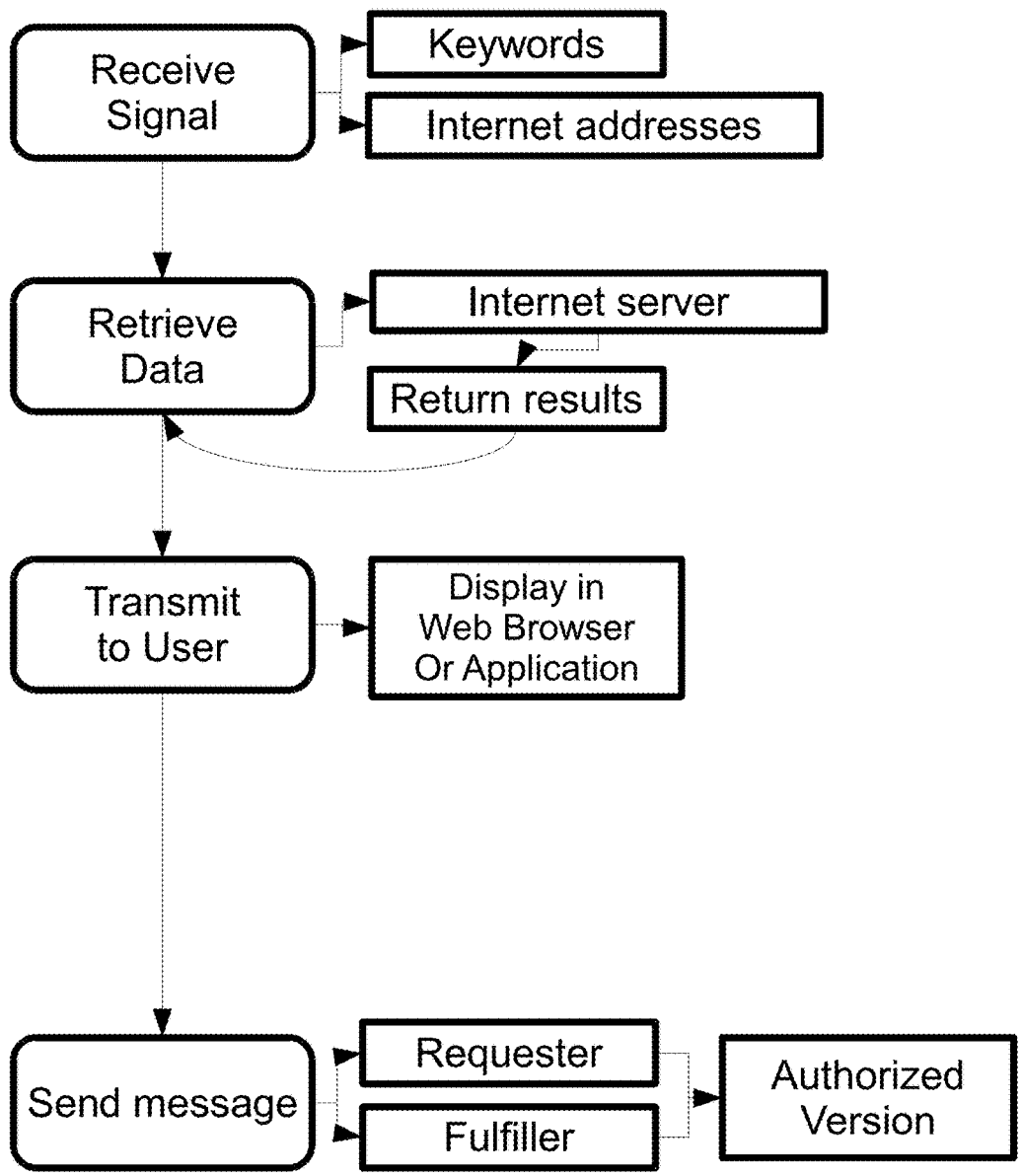
FIG. 2 shows an exemplary flowchart of monitoring websites for requests for and sharing of passwords to video streaming content and an exemplary process for which the present disclosure operates.

As shown in FIG. 2, shows a flowchart of an exemplary embodiment of the present disclosure.

As shown in FIG. 3, exemplary data is shown from the database. As is shown here, this information is not to be taken as a limitation or exclusive.

As shown in FIG. 4, two exemplary search websites along with associated keywords are shown. The search string used to initiate the command request that will be sent to the web server associated with the website. Here, the website is Twitter®. In the first example, Twitter® is being requested to return communications associated with "netflix" and "password". This would be associated with password sharing. Anyone on Twitter® who makes a request for a password for Netflix® will be returned for further analysis. In the second example, Twitter® again is being request to return communications associated with the given keywords. Here, Twitter® will return communications associated with "periscope" and "superbowl". This example is associated with the live streaming of a sporting event using an LSA.

Figure 5:
FIG. 5 shows an exemplary process of entering in a new search website and associated keywords.

As shown in FIG. 5, an exemplary form for entering in a new search web site and keywords is shown. Here, the Big Ten Network® (BTN) is shown and will be the focus of the search. The source is Twitter®, although it could be many other sources, including, but not limited to, Facebook®, Google+®, Facebook® Live, YouTube®, Instagram® Live, among others. The scrape URL shows the keywords used in the command request that will be sent to Twitter®. Here, the keywords are "big ten network". Thus, this example is associated with either password sharing, where users are sharing passwords to the BTN2Go® application or the Big Ten Network® web site, or with live streaming, such as on, but not limited to, Periscope®, Facebook® Live, or Meerkat®, among others. The live streaming could be a user placing their phone that is running an LSA in front of their TV or in front of a TV at a bar, for example. Or, the live streaming could be from the sporting event itself, where the user would use an LSA on their phone to show and stream the content onto to the internet to the viewers.

FIG. 6, an exemplary result found for a search that used the BTN as a search term is shown. Here, a college football game, with "Ohio" in the result was found on Twitter®. FIG. 6 also shows, in yet another embodiment of the present disclosure, a screenshot of Periscope® live feed of a college football game. In yet another embodiment, a video recording of the live stream will be made. The user's name was covered to protect the user's privacy, but the user's name will be recorded for future reference, to check if the user is a repeat offender, and for litigation purposes. In FIG. 6, a comment was made by a viewer with that message broadcasting to everyone else in the live stream.

In yet another embodiment, the present disclosure collects information about the stream, the streamer and the viewers, taking screenshots and video recording the live stream, for litigation purposes. If the content provider wants to pursue litigation against any of those involved in the streaming of the video streaming content, the present disclosure would provide such advantages over current methods of sending a DMCA takedown notice.

In yet another embodiment, the present disclosure provides a computer-implemented method, the method comprising, using a processor and memory of a network connected computer to select and to place into memory at least one keyword from a list of keywords and at least one website address from a list of website addresses that are stored on a non-transitory computer-readable storage medium of a network connected computer; sending a command request comprising the at least one keyword from a network connected computer to a web server associated with at least one of the selected website addresses to request the web server return communications associated with at least one of the selected keywords; receiving the communications from the web server on a network connected computer; using a processor and memory of a network connected computer to run pattern matching on the communications to extract and to place into memory resolved website addresses found to match video streaming services; establishing a connection to at least one web server associated with at least one of the resolved website address found to match video streaming services; gathering and storing, on a non-transitory computer-readable storage medium of a network connected computer, information associated with the received communications and with the resolved website address found to match video streaming services; and sending at least one electronic message to the streamer or viewers of the media content and providing a link to be able to purchase an authorized version of the video or music stream associated with the established relationship comprising of an internet address link to an authorized version of the video stream.

The present disclosure allows for identifying an untitled or private stream originating from a specific or particular location on a map by receiving notification of private streams by infiltrating the network. The ability of the system to detect through crawling and manual entry to subscribe to or follow LSA networks which discuss, mention, trend or advertise the private Nano-Piracy of content sought to be identified, monitored, documented and addressed by content owners, law enforcement, national security or other stakeholders who cannot access the content because of the countermeasures used by streamer to mask, hide or otherwise obscure their illegal activity. The system documents geographic information including, but not limited to, current location, longitude and longitude of streamer, time zone, and street address. The system also documents and learns in the persona database system the trends of social, geographic, temporal, content or subject matter to better scour for more private networks. Once the networks are infiltrated using at least one virtual persona, the present disclosure automatically receives notice of and access to private content. With this access, the present disclosure can then remediate per client requests. Additional, multiple identities will also seek and infiltrate other private Nano-Piracy networks' PNPN's while making it impossible to be differentiated from ordinary followers by the pirate. The virtual personas will also be preprogrammed to respond the communications by a pirate seeking to verify authenticity using preprogrammed learned responses as well as notification of human attendant for override responses that were previously not in database.

In yet another embodiment, the present disclosure provides for a computer-implemented method, the method comprising, using a processor and memory of at least one network connected computer to process at least one keyword and at least one internet address; automatically retrieving a first data set that correspond to the at least one processed keyword from the at least one processed internet address; automatically retrieving a second data set from a second internet address that is associated with the first data set; automatically retrieving a third data set from at least one internet address other than the first and second internet addresses that is associated with the first and second data sets; using a processor and memory to combine the data from all sources; and sending at least one electronic message to the individual who shared the information one the first processed internet address or to at least one individual who is associated with the second internet address, wherein the electronic message comprises at least a link to purchase an authorized version of the media content related to the first data set or the second data set.

In one aspect of this embodiment, the first data set, second data set and third data set are combined to create a more detailed data set. Because the data is gathered from multiple sources, the data gathering would not be limited by bottlenecks in network bandwidth or from slow computers, web servers or databases. The gathering process would not be slowed down or held back as it waits for slowness in network traffic. The enhancement can also be done by combining other information, such as, but not limited to, IP numbers, authentication numbers, authentication strings, unique identifiers, social media profiles, blog websites, pictures or movies of the individual, information about the media content being shared, among others. The process of gathering from multiple sources will help with law enforcement and identity purposes.

In one aspect of this embodiment, the second data set comprises of information obtained from the second source. Here, the second source could be a website address, such as a link to Periscope®, or a password to an online video streaming service, such as HBO®. The information gathered from the second source includes, but not limited to, the streamer, the viewers, their IP addresses, time and date the stream started and ended, pictures, video, audio, among other information. In another aspect of this embodiment, the third data set comprises of information obtained from sources other than the first or second sources. These sources include, but are not limited to, LinkedIn®, Google+®, forums, blogs, news sites, among others. This information comprises, but is not limited to, names, addresses, email addresses, phone numbers, pictures, video, audio, among others.

In yet another embodiment, the present disclosure provides for a computer-implemented method, the method comprising: receiving to a network connected computer a signal from a web browser or web application when a computer user activates a link on a web page, wherein the link comprises at least one keyword and at least one internet address; using a processor and memory of the network connected computer to automatically retrieve data from the at least one internet address, wherein the data retrieved comprises of information relating to the at least one keyword to create a first data set; using a processor and memory of the network connected computer to automatically retrieve data from at least one internet address relating to the first data set, wherein the retrieved data is combined with the first data set; using a processor and memory of the network connected computer to transmit the combined data to the web browser to be displayed on the web page; and using a processor and memory of the network connected computer to send at least one electronic message to an individual relating to the first data set, wherein the electronic message comprises at least a link to purchase media content related to the first data set.

In yet another embodiment, the present disclosure provides for a computer-implemented method for identifying, disrupting and monetizing the illegal sharing and viewing of video streaming content, the method comprising: using a processor and memory of a network connected computer to place into memory at least one keyword and at least one internet address; sending a command request from a network connected computer to a server associated with the at least one internet address to request the server return information associated with the at least one keyword; sending a command request from a network connected computer to another server associated with the retrieved information to request the server return information associated with the retrieved information; and sending at least one electronic message associated with the retrieved information comprising of a link to an authorized version of the video stream.

What is claimed is:

1. A computer-implemented method for identifying illegal sharing and viewing of video streaming content, the method comprising:

using a processor and memory of at least one network connected computer to process at least one keyword and at least one internet address;

retrieving a first data set that corresponds to the at least one keyword from the at least one internet address, wherein the first data set comprises of at least one other internet address, and wherein the first data set further comprises of information associated with access to video streaming content or the video streaming content;

retrieving a second data set from the at least one other internet address contained in the first data set;

retrieving a third data set that corresponds to either the first data set or the second data set or both from one or more other internet addresses that correspond to either the first data set or the second data set or both; and sending at least one electronic message to at least one individual associated with the first data set or to at least one individual associated with the second data set wherein the first data set further comprises of information regarding the internet protocol number of the at least one individual associated with the first data set, the date and time the information was shared, and at least a screenshot of shared information.

2. The computer-implemented method of claim 1, wherein the second data set further comprises information of a video streaming service associated with the second data set, including an internet protocol number of the individual who is streaming the video, the date and time of the video stream, the length of the video stream, and the length that the individual who is viewing or has viewed the video stream.

3. A computer-implemented method for identifying illegal sharing and viewing of video streaming content, the method comprising:

using a processor and memory of a network connected computer to automatically place into memory at least one keyword and at least one internet address;

automatically sending a command request from a network connected computer to a server associated with the at least one internet address to request the server return information associated with the at least one keyword;

automatically sending a command request from a network connected computer to another server associated with the returned information to request the other server return information associated with the returned information; and sending at least one electronic message to at least one individual associated with the returned information comprising of a link to an authorized version of media content associated with the at least one keyword wherein the returned information further comprises information about an individual who shared a web site address link associated with the returned information, including the individual's internet protocol number, the date and time the returned information was shared, and at least a screenshot of electronic message associated with the returned information.

4. A computer-implemented method for identifying illegal sharing and viewing of video streaming content, the method comprising:

using a processor and memory of a network connected computer to automatically place into memory at least one keyword and at least one internet address;

automatically sending a command request from a network connected computer to a server associated with the at least one internet address to request the server return information associated with the at least one keyword;

automatically sending a command request from a network connected computer to another server associated with the returned information to request the other server return information associated with the returned information; and sending at least one electronic message to at least one individual associated with the returned information comprising of a link to an authorized version of media content associated with the at least one keyword;

wherein the information retrieved about the individual who is streaming the video streaming content and the individuals of the video stream comprises the individuals' internet protocol numbers, the date and time of the video stream, the length of the video stream, and the length the individual are viewing or have viewed the video stream.

\* \* \* \* \*